Patented June 9, 1925.

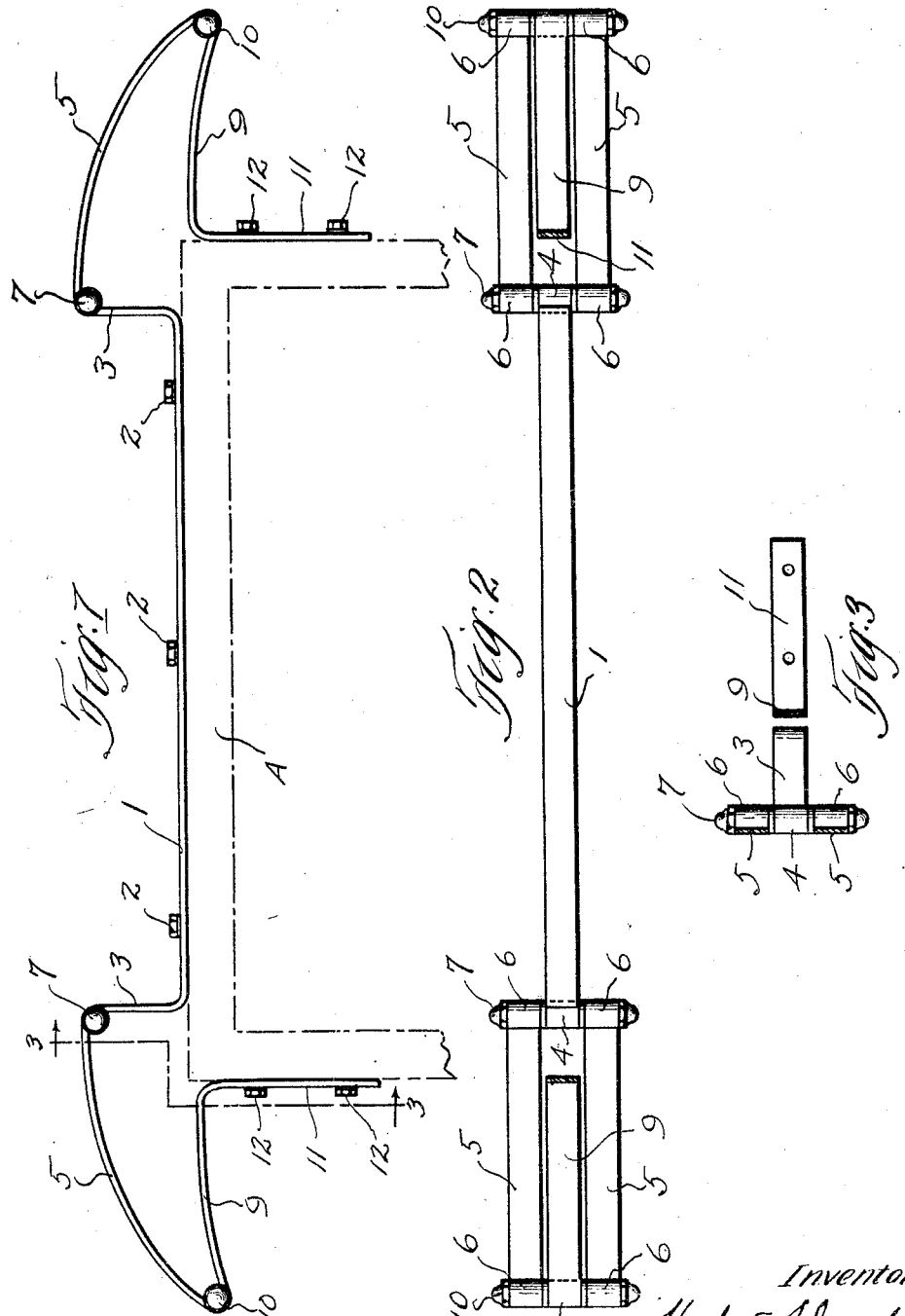

1,541,053

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed August 20, 1924. Serial No. 733,135.

*To all whom it may concern:*

Be it known that I, HERBERT S. JANDUS, a citizen of the United States, residing at Detroit, in the county of Wayne and State of Michigan, have invented a certain new and useful Improvement in Bumpers, of which the following is a full, clear, and exact description, reference being had to the accompanying drawings.

This invention relates to bumpers, and more particularly to combined bumpers and fender guards, adapted to be applied to the rear ends of automobiles and similar vehicles.

The invention disclosed herein is embodied in a bumper and fender guard wherein a space or pocket is provided, between the body of the bumper and the fender-guard portions thereof, for the reception of a spare tire.

It is the general purpose and object of the invention to provide a combined bumper and fender guard of the foregoing type which shall be simple in construction and inexpensive to manufacture, and one wherein the ends of the fender-guard portions of the bumper will be resiliently supported, thereby increasing the efficiency of such portions.

A further object is to provide a combined bumper and fender-guard of the aforesaid character which shall comprise central and end attaching portions, and which may be folded up or disassembled for shipment in such manner that the over-all length need not exceed the length of the central portion thereof.

With these and other objects in view, the invention consists in the various novel features of construction and arrangement or combination all of which will be described hereinafter and pointed out in the appended claims.

In the drawing accompanying and forming a part of the application, Fig. 1 is a plan view of a bumper embodying my invention; Fig. 2 is an elevation of said bumper; and Fig. 3 is a sectional view corresponding to the line 3—3 of Fig. 1.

Describing the various parts by reference characters, 1 denotes a bar of resilient spring steel which is adapted to be attached to the rear cross member of the vehicle frame A, in any suitable manner, as by means of bolts 2 or in some instances by means of the spare tire carrier brackets not shown. The end portions of this bar are bent rearwardly as indicated at 3 and each end terminates in an eye 4.

Cooperating with the end portions of the bar 1 are upper and lower spring-plate bars 5. Each of these bars is provided at each end with an eye 6, the eyes at the inner ends of the bars 5, registering with the corresponding eye 4 of bar 1 and being secured thereto by means of a bolt 7. The bars 5 are curved outwardly and forwardly and are disposed substantially parallel with the bar 1. The eyes at the outer ends of the bars 5 are adapted to register with the corresponding eye 8 of bumper attaching arms 9 and are secured thereto by means of a bolt 10. Each arm 9 is provided with a portion 11 which is adapted to be fastened to the side members of the vehicle frame by means of bolts 12 or other suitable fastening means. As shown in Fig. 1, the outer ends of the arms 9 are bent slightly forwardly and these arms serve as resilient supports for the bars 5.

The construction above described is relatively cheap to manufacture and by reason of the arms 3 and 9, a resilient support is provided for the bars 5. The space between the rearwardly extending arms 3 defines a tire carrying space or pocket for the reception of one or more tires.

A bumper constructed as above described may be conveniently shipped either by folding the bars 5 and outer attaching arms about the bolts 7 as pivots, so that the fender-guard portions are disposed within and between the arms 3, or by disconnecting these portions from the bolts 7, thereby enabling the bumper to be shipped with an over-all length not exceeding the length of the bar 1.

Having thus described my invention, what I claim is:

1. A bumper comprising a bar adapted to be fastened to the rear of a vehicle, an upper and a lower bar secured at their ends to, and respectively above and below, the corresponding ends of the first mentioned bar, the said upper and lower bars projecting outwardly and forwardly from such ends, and arms connecting the outer ends of said upper and lower bars to the sides of the vehicle.

2. A bumper comprising a bar adapted to be fastened to the rear of a vehicle, an upper and a lower bar secured at their ends to, and respectively above and below, the corresponding ends of the first mentioned bar, the said upper and lower bars projecting outwardly and forwardly from such ends, an arm connected to each side of the vehicle and projecting outwardly therefrom, and a connection between said arms and the corresponding upper and lower bars.

3. A bumper comprising a bar adapted to be fastened to the rear of a vehicle and having its ends turned rearwardly to provide a space or pocket for the reception of one or more tires, a pair of bars connected to each of said rearwardly turned ends, each pair of bars extending outwardly and forwardly, and an arm connecting the outer ends of each pair of bars with the side of the vehicle.

4. A bumper comprising a bar adapted to be fastened to the rear cross member of a vehicle frame, the ends of said bar being turned rearwardly to provide a space or pocket for the reception of one or more tires, a pair of spaced parallel bars connected to each of said rearwardly turned ends, each pair of bars extending outwardly and forwardly, and a bar connecting the outer ends of each pair of bars with the side of the vehicle frame.

5. A bumper comprising a bar adapted to be fastened to the rear of a vehicle frame and having its ends turned rearwardly to define a space or pocket for the reception of one or more tires, fender-guards connected to the rearwardly turned ends of said bar, and a connection between the outer ends of said fender-guards and the side of the vehicle frame.

6. A bumper comprising a bar adapted to be fastened to the rear of a vehicle frame and extend transversely with respect to said frame, a fender-guard connected to the end portion of said bar and extending outwardly and forwardly, and a second connection between said fender guard and the vehicle frame.

7. A bumper comprising a bar adapted to be fastened to the rear of a vehicle frame and having its ends turned rearwardly to define a space or pocket for the reception of one or more tires, an upper and a lower bar secured at their ends to, and respectively above and below, the corresponding ends of the first mentioned bar, the said upper and lower bars projecting outwardly and forwardly from such ends, and an arm connected between said upper and lower bars at their outer ends, said arm being connected with the side of the vehicle frame.

In testimony whereof, I hereunto affix my signature.

HERBERT S. JANDUS.